US012719690B2

(12) United States Patent
Janardhanan et al.

(10) Patent No.: US 12,719,690 B2
(45) Date of Patent: Aug. 25, 2026

(54) ISSUANCE OF A DIGITAL PRESENTABLE USER IDENTITY

(71) Applicant: Apple Inc., Cupertino, CA (US)

(72) Inventors: Vishnu Janardhanan, Fremont, CA (US); Ahmer A. Khan, San Jose, CA (US); Gianpaolo Fasoli, Burlingame, CA (US); Dian Wen, San Jose, CA (US); Hicham Lozi, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/623,263

(22) Filed: Apr. 1, 2024

(65) Prior Publication Data

US 2024/0333512 A1 Oct. 3, 2024

Related U.S. Application Data

(60) Provisional application No. 63/456,409, filed on Mar. 31, 2023.

(51) Int. Cl.

*H04L 9/32* (2006.01)
*H04L 9/08* (2006.01)

(52) U.S. Cl.

CPC .......... *H04L 9/3231* (2013.01); *H04L 9/0825* (2013.01); *H04L 9/3247* (2013.01)

(58) Field of Classification Search

CPC ............................ H04L 9/3231; H04L 9/3247
See application file for complete search history.

(56) References Cited

U.S. PATENT DOCUMENTS

| | | | | |
|---|---|---|---|---|
| 9,900,309 | B2 * | 2/2018 | Toth | H04L 63/0823 |
| 10,963,669 | B2 * | 3/2021 | Berini | G06F 21/32 |
| 2021/0279989 | A1 * | 9/2021 | O'Sullivan | G06N 20/00 |

* cited by examiner

*Primary Examiner* — Pramila Parthasarathy
(74) *Attorney, Agent, or Firm* — Kilpatrick Townsend & Stockton LLP

(57) ABSTRACT

Techniques are described for generating a verified data package. An example method includes receiving data including biographical information and an associated portrait. The method further includes causing a prompt for a user to capture a self-portrait photograph to be displayed based at least in part on receiving the data. The method further includes receiving the self-portrait photograph based at least in part on the displayed prompt. The method further includes causing data and the self-portrait photograph to be transmitted to a server. The method further includes receiving, from the server, a verified data package comprising the biographical information, the portrait, and an attestation that the self-portrait photograph and the portrait are the user.

17 Claims, 12 Drawing Sheets

RECEIVE DATA INCLUDING BIOGRAPHICAL INFORMATION AND AN ASSOCIATED PORTRAIT 1102

CAUSE A PROMPT FOR CAPTURING A SELF-PORTRAIT PHOTOGRAPH TO BE DISPLAYED BASED AT LEAST IN RESPONSE TO RECEIVING THE DATA 1104

CAUSE THE SELF-PORTRAIT PHOTOGRAPH TO BE CAPTURED BASED AT LEAST IN PART ON RECEIPT OF A SELECTION OF THE PROMPT 1106

CAUSE THE DATA AND THE SELF-PORTRAIT PHOTOGRAPH TO BE TRANSMITTED TO A SERVER 1108

RECEIVE, FROM THE SERVER, A VERIFIED DATA PACKAGE COMPRISING THE BIOGRAPHICAL INFORMATION, THE PORTRAIT AND AN ATTESTATION THAT THE SELF-PORTRAIT PHOTOGRAPH AND THE PORTRAIT ARE THE USER 1110

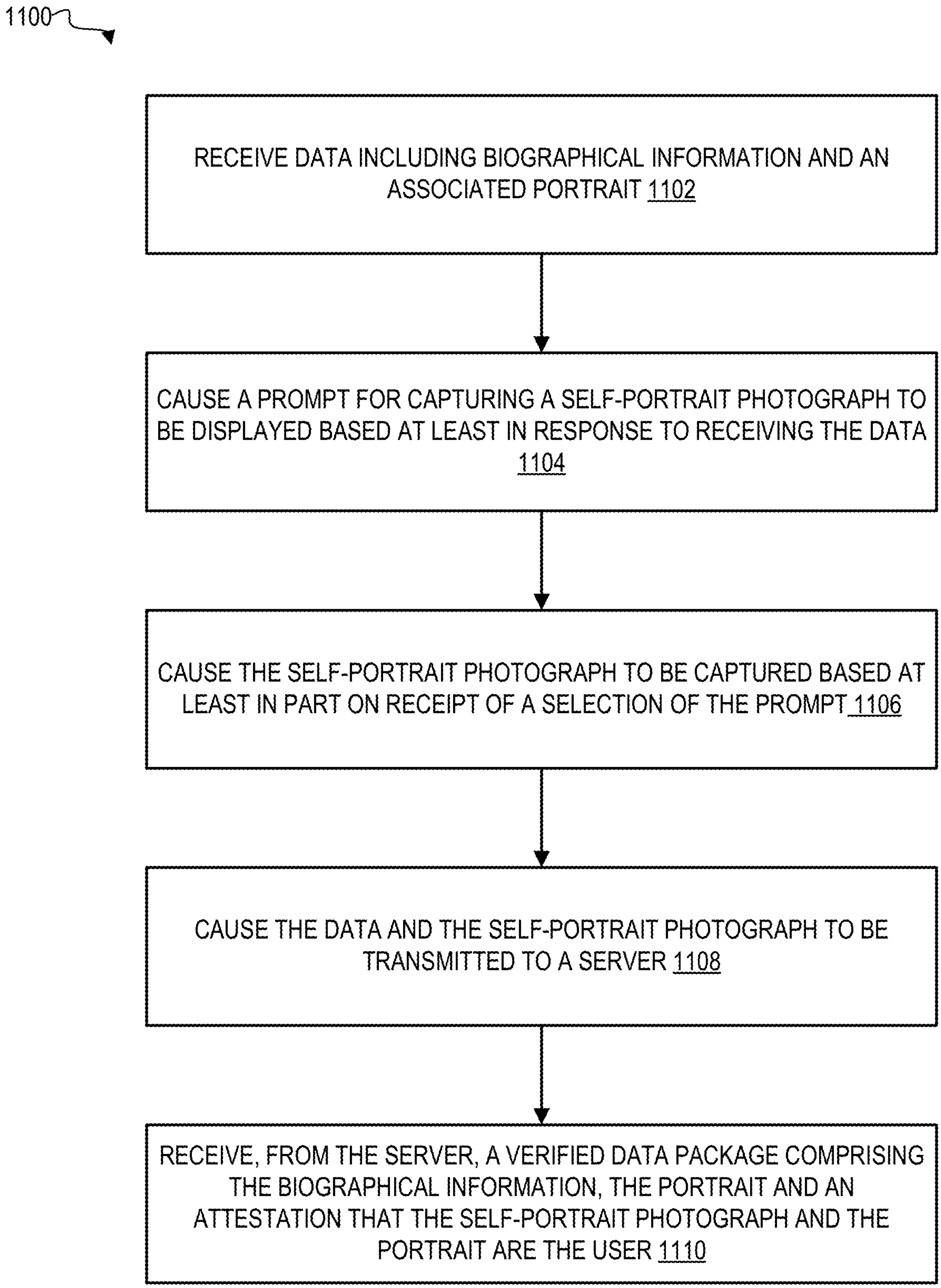

COMPARE THE SELF-PORTRAIT PHOTOGRAPH AND THE PORTRAIT TO DETERMINE WHETHER THE SELF-PORTRAIT PHOTOGRAPH AND THE PORTRAIT ARE A SAME USER 1204

GENERATE A VERIFIED DATA PACKAGE COMPRISING THE DATA AND AN ATTESTATION THAT THE SELF-PORTRAIT PHOTOGRAPH AND THE PORTRAIT IDENTIFY THE SAME USER 1206

TRANSMIT THE VERIFIED DATA PACKAGE TO THE APPLICATION ON THE USER DEVICE 1208

ISSUANCE OF A DIGITAL PRESENTABLE USER IDENTITY

CROSS-REFERENCES TO RELATED APPLICATIONS

This application claims the benefit of U.S. Provisional Application No. 63/456,409, filed on Mar. 31, 2023, which is incorporated by reference in its entirety.

BACKGROUND

Digital documents can include readable content that can be presented to third parties through electronic devices. In a sense, digital documents can be considered paperless replacements of original paper documents. Digital documents can be stored on and presented using electronic devices, such as mobile phones or tablets. These digital documents can offer advantages to paper documents, including improving storage capacity, accessibility, organization, and security.

BRIEF SUMMARY

Users can store credentials, which include identifying information and financial information, in digital format on their devices for presentation to an appropriate authority. Using computers and the credentials, users can now browse available goods and services, make selections, and effectuate transactions without being physically present, and without having to produce physical credentials. Certain transactions, such as opening a bank account and passing security at an airport require enhanced scrutiny of the credentials. This can be the case when a user is presenting a credential in person or remotely. To provide appropriate verification, a user can provide a credential that is verifiable by a relying party. However, the relying party may still need to have the ability to determine that the credential is not being presented by someone other than the credential owner. One issue for credential verification can be that identity services can match presented information to information stored in a database, but cannot verify if the person presenting the information is actually the person whose information is being presented.

Embodiments described herein provide verification techniques for creating a verified data package that can be presented to one or more relying authorities to verify the identity of the user. A user can use an application on their phone to retrieve biographical information and a portrait from a digitally enhanced identification (e.g., a digital passport or enhanced driver's license). The user can further capture a live self-portrait photograph (e.g., selfie). The user can the application to transmit the biographical information, portrait, and self-portrait photograph to a server. The server can use image processing and a machine learning model to verify that the person in the portrait is the same person that captured the self-portrait photograph. Based on determining a match, the server can generate a verified data package that includes the biographical information, the portrait, and an attestation that the portrait is the same person that captured the self-portrait photograph. The server can sign the verified data package and then transmit the signed verified data package to the application on the user's device. The application can store the verified data package on the device and the verified data package can be reused each time the user is requested to verify their identity.

BRIEF DESCRIPTION OF THE DRAWINGS

FIG. 11 is a process flow for initiating generating a verified data package, according to one or more embodiments.

DETAILED DESCRIPTION

Figure 1:
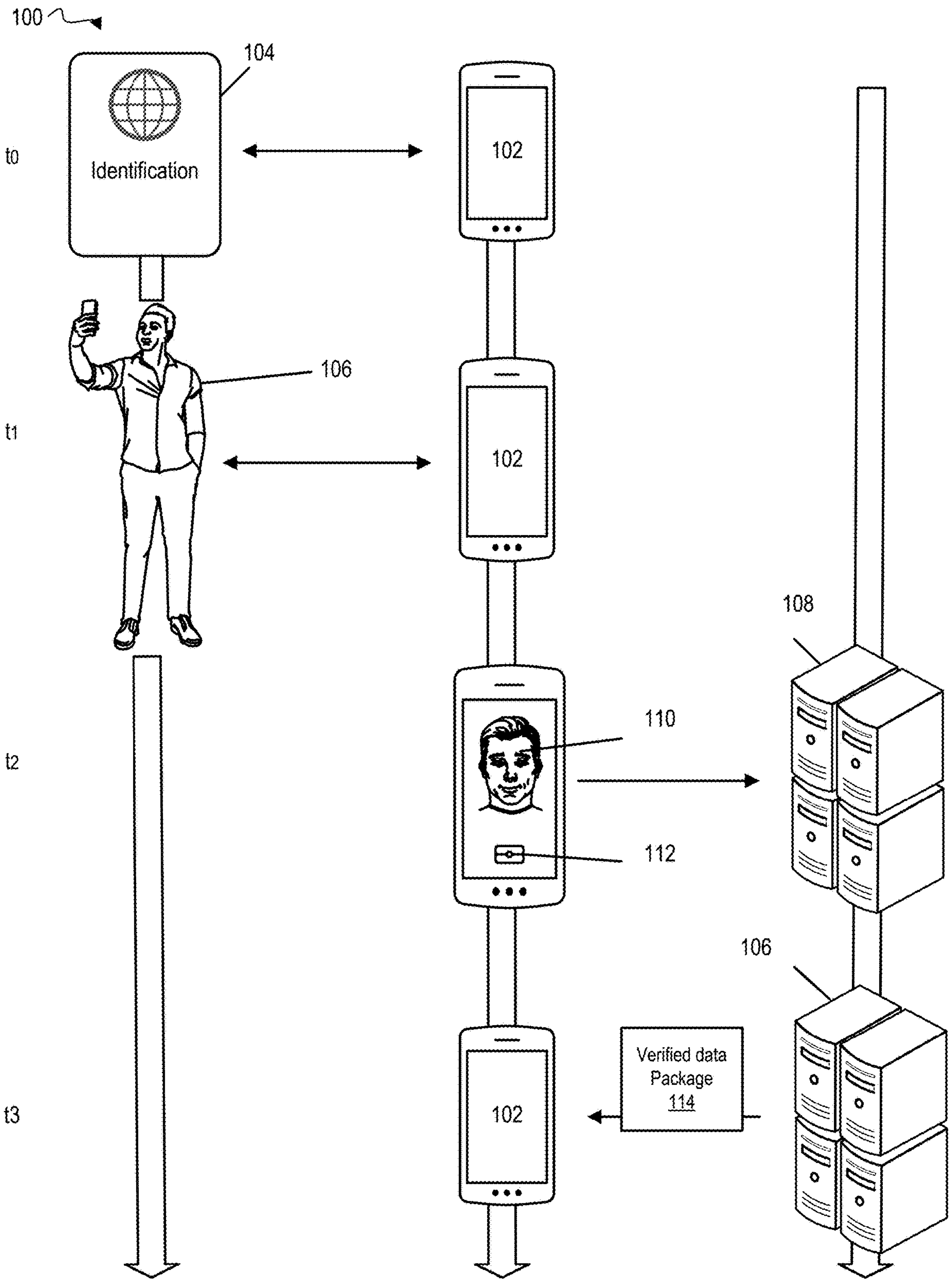
FIG. 1 is an illustration of a process for generating a verified data package, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein provide credential verification techniques for creating a reusable verified data package that can be presented to one or more relying authorities to verify identity. A user can use an application on their device to scan a physical document, such as a driver's license, passport, credit card, or other similar document. The scan can include a photograph of the document and machine readable zone (MRZ) of the document. The MRZ can include information such as a document number, country code, nationality, and date of birth. The user can further use the application on their device to read a microprocessor chip embedded in the document using a short range transmission protocol, such as near field communication (NFC). The chip can include information that identifies the owner of the document (e.g., name, identification number, address, eye color, weight, height).

The user can further be prompted by an application to use their device to take a self-portrait photograph (e.g., selfie). The device can further generate a signing key and a hardware attestation to be presented to a third party for verification of the device. The signing key can be biometrically locked to prevent anyone but the user from accessing the key. The application on the device can further encrypt the data retrieved from the document, the self-portrait photograph, and sign the encrypted data with the signing key. The user can use the application on the device to transmit the encrypted data to a verification server.

The verification server can decrypt the data and validate the device using the hardware attestation, validate the data using the signing key and a public key. The verification server can further use a machine learning model to compare the self-portrait photograph and the photograph from the document to generate a verification score. The verification score can be compared to a threshold score to determine whether the identity of the document owner matches the identity of the person who took the self-portrait photograph. In the event that the identity of the document owner is determined to match the identity of the person who took the self-portrait photograph, the verification server can further generate a verified data package that includes the identifying information retrieved from the document, device identifying information, the portrait from the document, and an attestation based on the verification score. The verification server can further transmit the verified document package to the application on the device.

The user can further use the application to present the verified package to a relying authority. For example, the user can be attempting to open a bank account from a remote location and may be requested to verify his/her identity. Simply transmitting a digital driver's license from their phone may not resolve the issue of whether the holder of the phone is the same person whose digital driver's license is being transmitted. The user can have previously undergone the above described self-portrait photograph matching process described above and use the application to transmit the verified data package to the bank. The bank can verify the device that transmitted the verified data package is the device that was issued the verified data package using the device identifying information. The bank can further verify the identity of the user using the identifying information and portrait from the verified data package.

In some instances, additional verification can be provided to enhance the verification. For example, the user can physically present themselves to a trusted authority, such as a traffic and safety administration (TSA) official, a law enforcement officer, or other trusted authority. The user can use the application on their device and present their digital credential to a reader, which can display the user's portrait. The trusted authority can visually compare the portrait displayed on the reader and the user. The trusted authority can further determine that the person who is physically present and the person in the portrait are the same or different people. If the trusted authority determines that the person who is physically present and the person in the portrait are the same, the trusted authority can use the reader to generate an attestation. The reader can transmit the attestation and a reader identifier to the device. The reader can further include an identifier of the trusted authority in the transmission that can indicate the integrity of the attestation.

The user can use the application on the device to transmit the attestation and the identifier to the verification server. The verification server can transmit the attestation and identifier to an issuing authority. The issuing authority can be a server of the entity that manages the trusted authority. For example, if the verified data package is for a driver's license, the issuing authority can be a driver's license agency. The driver's license agency can use the attestation and reader identifier to determine whether the attestation was issued by a valid reader and generate an attestation. The issuing authority can transmit the determination to the verification server. The verification server can generate an enhanced verified data package that includes the identifying information retrieved from the document, device identifying information, the portrait from the document, the verification score, and the attestation of live image matching by the trusted authority.

FIG. 1 is an illustration of a process 100 for generating a verified data package, according to one or more embodiments. A user can use a user device, such as a smart phone or tablet, to initiate the generation of a verified data package. It should be appreciated that the functionality described with respect to the user device 102 is performed by an application executing the user device 102. The application is described with more particular with respect to FIG. 3. The user can use their own device to scan an identifying document, such as a driver's license, passport, or credit card. The document 104 can include a visual inspection zone (VIZ) and a machine readable zone (MRZ). The VIZ can include a portrait of the user and printed biographical information. The MRZ can include user's data, forgery detection characters, and a checksum. A device, such as the user's smart phone, can scan the document 104 and recognize the MRZ. The device can generate a localized image of the MRZ and the device can parse the MRZ extract individual characters in the MRZ. The device can use known MRZ formats to segment the characters into data fields. The device can further include optical character recognition (OCR) capability. The device can use OCR techniques to recognize the information (e.g., biographical information) printed on the document 104. The device can further compare the biographical information printed on the document 104 to the information included in the MRZ. The device can further calculate a checksum and compare it with the original to validate the MRZ.

The document 104 can further include a chip that is operable for short range transmission. The chip can be a radio frequency identification (RFID) chip or a near field communication (NFC) chip embedded in the document. For example, US e-Passports can now include an electronic chip on a back page of the e-Passport. The chip can include the same information as provided on the physical document (e.g., name, address, nationality, and other biographical information). In addition, the chip can include biometric information, such as a portrait, fingerprint data, and iris scan.

The chip can include a security feature to protect the chip from unauthorized eavesdropping or skimming. For example, the chip can be protected using a basic access control (BAC) security features. The chip can protect access to the information stored on the chip using a first digital key, such as a message authentication code. The device can include a key derivation function (KDF) to derive the first digital key and the second digital key using information encoded in the MRZ. Therefore, scanning the MRZ can be used to access information on the chip. The belief is that even if a bad actor has a skimming device and attempts to skim information from the chip surreptitiously, the bad actor will not have visual access to the MRZ, as the authorized document holder is not likely to have the document out of their pocket and open to the MRZ.

At a first point in time, $T_0$, a user can use a user device 102 to scan a document 104, such as an e-Passport, and e-driver's license, or some other credential that the user may use to receive some service, product or access. The device can include, for example, a smart phone or a tablet. The user can unlock a screen of the user device 102 and tap an icon to initiate a verified data package generation sequence. The user device 102 can include an image-capturing device, such as a camera, which the user can point at the document. The scanned portion of the document 104 can include a VIZ and an MRZ. The user device 102 can be configured with standard layouts of the document 104 and detect the VIZ. For example, it can be common in documents for the VIZ to be positioned above the MRZ. The user device 102 can further determine each data field (e.g., name, address) included in the VIZ, based on the layout. For example, the user device 102 can use the layout to determine the position of the name of the user. The user device 102 can further use OCR techniques to determine the characters of each data field on the VIZ.

The user device 102 can further recognize the position of the MRZ based at least in part on the layout. The user device 102 can use OCR techniques to recognize the characters in the MRZ. The device can be configured with standard MRZ formats (e.g., travel document 1 (TD-1), travel document 2 (TD-2), and machine readable passport (MRP)) and segment the characters into different data fields. The data fields can include, for example, a username, a document identifier, a citizenship, a birthdate, a gender, and a document expiration date. The MRZ can also include check digits for using to determine fraud.

The user device 102 can compare the information from the MRZ with the information from the VIZ to validate the document. For example, the user device 102 can compare the name from the MRZ with the name from the VIZ to determine whether the names match. If the names match, the user device 102 can determine that the document 104 is validated. The user device 102 can further use the information from the MRZ to generate inputs for a KDF to generate keys to access the chip. For example, the inputs can be based on one or more of the data fields of the MRZ (e.g., username, document identifier, birthdate, and document expiration date). The user device 102 can use the KDF to derive a first digital key to access the chip, and a second digital key to encrypt communication with the chip.

The user device 102 can use a short range transmission protocol to transmit a message, which includes the first digital key, to the chip. For example, the user device 102 can use an NFC transmission technique, a Bluetooth transmission technique, or a Wi-Fi Aware transmission technique to transmit the message including the first digital key to the chip. The chip can validate the communication with the user device 102 based on the first digital key, the chip can acknowledge the validation and the chip, and the user device 102 can initiate a secure session to communicate with each other using the second digital key for encryption. The user device 102 can retrieve the information from the chip, including the biographical information and the biometric information, during the secure session.

At a second point in time, $T_1$, the user device 102 can prompt the user 106 to use the user device 102 to take a live self-portrait photograph. For example, the user device 102 can display a prompt asking the user to take the live self-portrait photograph. The prompt can be, for example, a question, "Can you take a live self-portrait photograph?" The user can enter an input to the prompt, which can initialize a camera application on the user device 102. The user 106 can take the self-portrait photograph, which can be stored on the user device 102 as a file, such as an image file. The image file can include an image of the user's face as well as a time stamp to indicate that the self-portrait photograph is a live self-portrait photograph.

At a third point in time, $T_2$, the user device 102 can transmit a message to a server 108, such as a verification server. The message can include the self-portrait photograph 110 taken by the user 106 at $T_1$, the information retrieved from the document 1004, including the chip data 112 from the chip embedded in the document 104. The information can further include a hardware attestation for validating the user device 102. In some embodiments, the message can be encrypted by the user device 102. For example, the user device 102 can generate a signing key for encrypting the message. The signing key can further be biometrically secured on the device. In other words, the signing key can be stored on a secure enclave of the user device 102, such that the key can only be accessed through a biometric verification (e.g., fingerprint, eye scan) of the user 106. Although in FIG. 1, it appears that the self-portrait photograph 110 and the chip data 112 are displayed on the user device 102, this is for illustration, and in practical situation the self-portrait photograph 110 and the chip data 112 may not necessarily be displayed on the device.

The server 108 can include a combination of hardware and software that services a verification application for verifying a user and generating a verified data package. As described above, user device 102 and the chip embedded in the document 104 can communicate using a short range transmission protocol. The user device 102 and the server 108, on the other hand, can communicate using various transmission technologies, such as Ethernet, fiber optics, microwave, Digital Subscriber Line (xDSL), Wireless Local Area Network (WLAN) technology, wireless cellular technology, or any other appropriate technology.

When the server 108 initially receives the message from the user device 102, the user device 102 is unknown to the server 108. The server 108 can decrypt the message from the user device 102. The server 108 can then validate the device using the hardware attestation. Once the user device 102 is known to the server 108, the server 108 can validate the data from the chip. For example, the server 108 can access a public key from a public key directory (PKD). The server 108 can further verify the digital signature was signed by the device using a public key retrieved from the PKD.

The server 108 can then use image processing techniques and a machine learning model to compare the live self-portrait photograph 110 and the portrait received from the chip data. The server 108 can further generate a confidence score as to the live self-portrait photograph 110 matching the portrait received from the chip data. If the confidence score is greater than a threshold confidence score, the server 108 can determine that the live self-portrait photograph 110 matches the portrait from the chip data. If the confidence score is less than the threshold confidence score, the server 108 can determine that the live-self-portrait photograph 110 does not match the portrait from the chip data.

At a fourth point in time, $T_3$, the server 108 can generate a verified data package 114 based on the validations performed at $T_2$ and the confidence score. The verified data package 114 can include a digital representation of the physical document scanned at $T_0$. For example, the verified data package 114 can include a digital representation of a driver's license, passport, insurance card, or membership card. The verified data package 114 can include the portrait and the biographical information from the chip. The verified data package 114 may not simply be an image of the physical document. Rather, the verified data package 114 can include mechanisms for establishing trust with an electronic reader. For example, the verified data package 114 can include mechanisms to indicate the verified data package 114 is being presented by the device to which it was issued. The verified data package 114 can further include mechanisms to indicate that the verified data package has not been altered from the time of issuance. For example, the server

108 can sign the verified data package 114 using a private key. At the time of presentment, a reader can validate that the verified data package 114 is signed by the issuer using a public key, such as a signer's certification. The verified data package 114 can further include mechanisms for ensuring that the verified data package 114 has not been altered from the time of issuance.

At some point, the user may desire to present the verified data package 114 to a relying party. For example, the verified data package 114 may include a mobile driver's license and the user may be requested to present identification for having a document notarized. The user can the user device 102 to present the verified data package 114 to a relying party to obtain some access, service, item, or permission. It should be appreciated that the verified data package 114 is reusable, and therefore, the user can continue to use the same verified data package 114 for additional relying parties.

Figure 2:
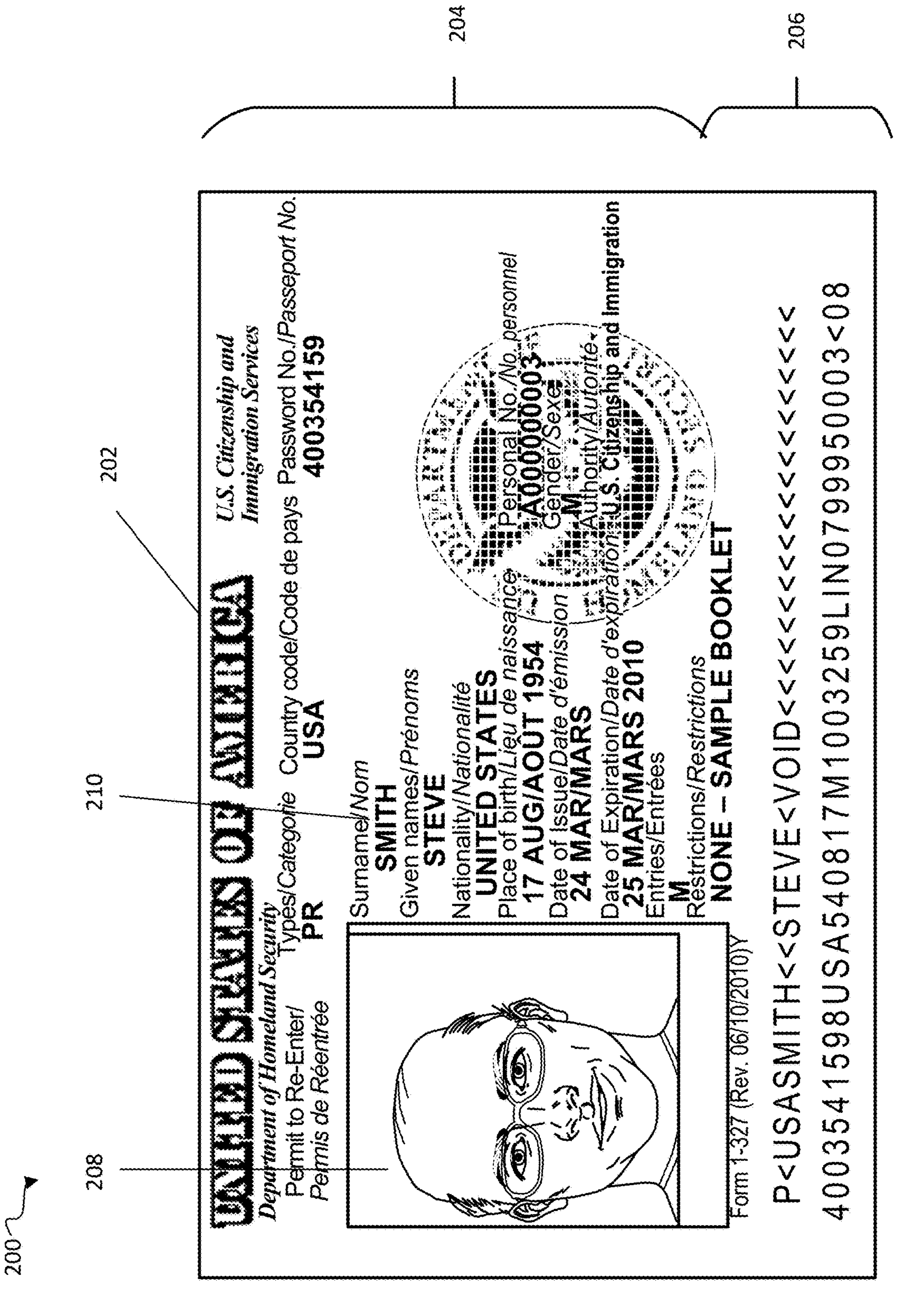
FIG. 2 is an illustration of a document to be used to generate a verified data package, according to one or more embodiments.

FIG. 2 is an illustration 200 of a document to be used to generate a verified data package, according to one or more embodiments. As illustrated, the document 202 can include a passport. The document includes a visual image zone (VIZ) 204 and a machine readable zone (MRZ) 206. The VIZ 204 can include a portrait 208 and biographical information 210. The portrait 208 can include a headshot of the document owner. In this case, the document owner is a man named John Doc. The biographical information 210 can include, for example, a document number, a document owner name, document owner birthdate, and document expiration date. The document can also include a name of an issuing authority. It should be appreciated that the document.

The MRZ 206 can include information identifying the document owner in a standardized format. The standardized format allows electronic readers to quickly parse the characters and identify the individual data fields. The MRZ 206 can also provide information for accessing a chip embedded in the document 202. The arrangement of the MRZ 206 can also be standardized. For example, documents can be standardized to arrange the MRZ 206 below the VIZ 204. The MRZ 206 can be divided into two or three lines of characters. The MRZ 206 can include a character to identify the type of document. As illustrated, the first letter of the first line of the document 202 is a "P" to indicate the document is a passport. The next three characters can include a country code. As illustrated, the country code is USA for the United States of America. The next set of characters can include the document owner's name. As illustrated, the document owner's name is Steve Smith. The first name and the second name can be separated by placeholder characters (e.g., "<"). The second line of the MRZ 206 can include the document number. As illustrated, the passport number can "400354159." The next character can be derived from the previous characters and indicate a correctness of the passport number. As illustrated the next character is an 8. The next set of three characters can include a country code. As illustrated, the country code for the United States of America is "USA." The next six digits can be a birthdate in year, month, and date format. As illustrated, Steve Smith was born on Aug. 17, 1954. The next digit can be an indication of sex. As illustrated, Steve Smith is a man, and his sex is indicted as M. The next set of characters are optional based on a desire of the issuing authority.

An application can use one of more of the above described fields to derive a first digital key to access the chip, and a second digital key to encrypt communications with the chip embedded in the document.

Figure 3:
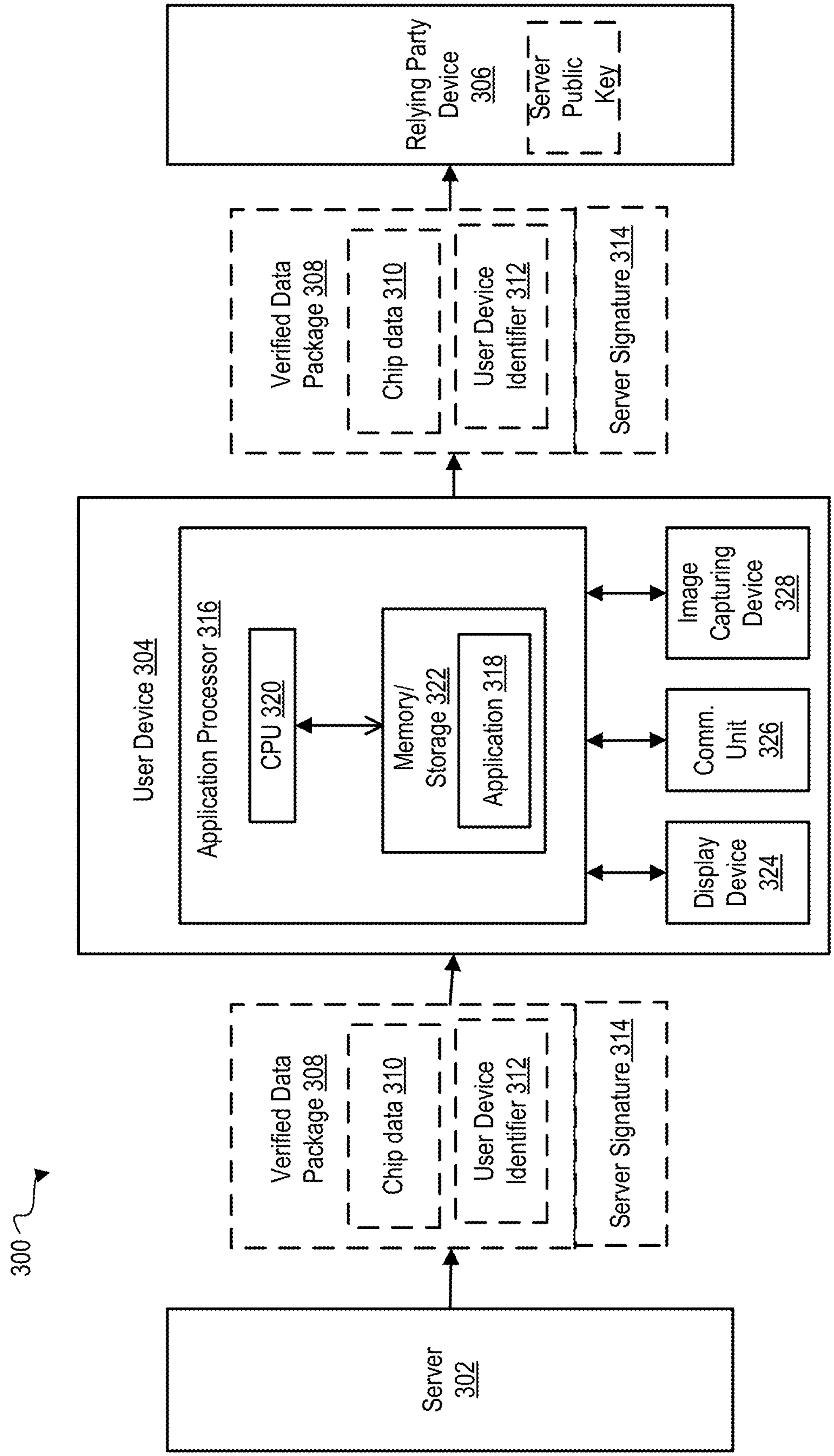
FIG. 3 is an illustration of a system for validation by relying party of a verified data package, according to one or more embodiments.

FIG. 3 is an illustration of a system 300 for validation by relying party a verified data package, according to one or more embodiments. From time to time, a user may wish to present their verified data package to a relying authority. For example, the user may wish to present an identification to open a bank account. This user can present their verified data package to the bank, and the bank can validate the verified data package. The system 300 can include a server 302, a user device 304, and a relying party device 306 for performing a verified key attestation, in which the properties of a public key of a verified data package and private key of the verified data package can be verified. For example, a server 302 (e.g., server 108), can provision the user device 304 (e.g., user device 102), with a verified data package 308 as described above. The verified data package 308 can include a chip data 310, such as chip data retrieved from a chip embedded into a document (e.g., document 104). The verified data package 308 can further include a user device identifier 312. The server 302 can include the user device identifier 312 for a party to later verify that the verified data package was issued to the user device 304. The verified data package 308 can further include server signature 314 that is generate by the server 302 using a private key. In some embodiments, the verified data package 308 can further be encrypted prior to transmission to another party.

The user can use the user device 304 to initiate a secure session with a relying party device 306. The user device 304 can include an application processor 316 for executing the application 318. The application processor 316 can include an integrated circuit with a central processing unit (CPU) 320 connected to memory 322. The application 318 can include, for example, resources and code for effectuating the functionality described herein. The application 318 can be stored in user device's storage (e.g., hard drive, solid-state drive, flash drive, or other non-volatile memory). In the instance that the user launches the application 318, the application's resources and code can be loaded into the memory 322 (e.g., random access memory (RAM)) to allow the CPU 320 to quickly access the application 318.

The user device 304 can further include a display device 324 (e.g., a touchscreen). A user can interact with the application 318 using the display device 324. For example, the user can use a touchscreen to make one or more selections for the application 318. The user can also receive one or more messages from the application 318 via the display device 324. The user device 304 can also include a communication unit 326 for interfacing with external computing devices. For example, the communication unit 326 can include software and circuitry for communicating using various technologies (e.g., Bluetooth, cellular, near field communication (NFC), Wi-Fi, and other communication technologies). The communication unit 326 can be used, for example, to communicate with the server 302 and the relying party device 306. The user device 304 can further include an image capturing device 328. The image capturing device 328 can, for example, be used to capture the self-portrait photograph 110 described with respect to FIG. 1.

For example, the user can present the user device 304 to a reader device of the traffic and safety administration (TSA) at the airport. The relying party device 306 can retrieve the verified data package 308 from the application 318 on the user device 304 and decrypt the verified data package 308. The relying party device 306 can retrieve a public key corresponding to the server private key to verify the server signature 314. The relying party device 306 can further use the user device identifier 312 to verify that the user device 304 is the device to whom the verified data package 308 was issued. The relying party device 306 can further use the chip data 310 and verify whether the person presenting the verified data package 308 is the same person identified in the chip data 310. The relying party device 306 can further determine whether to accept the verified data package 308 (e.g., for access into a country, for services, or other purpose).

Figure 4:
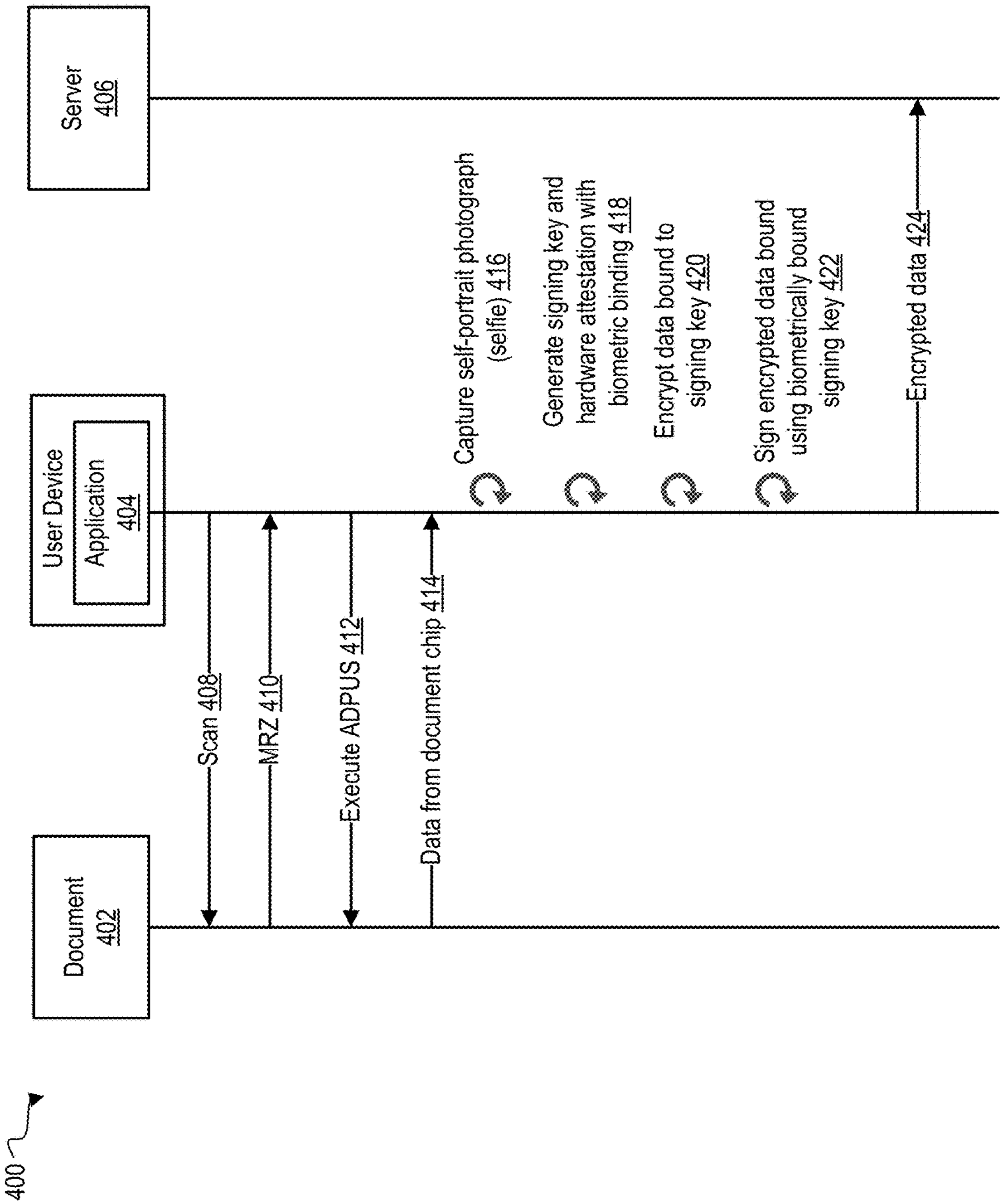
FIG. 4 is a process flow for initiating generation of a verified data package, according to one or more embodiments.

FIG. 4 is a process flow 400 for initiating generation of a verified data package, according to one or more embodiments. While some operations of processes 400, 500, 600, 800, 900, 1000, 1100, and 1200 are described as being performed by generic computers, it should be understood that any suitable device may be used to perform one or more operations of these processes. Processes 400, 500, 600, 800, 900, 1000, 1100, and 1200 are respectively illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

A document 402, an application 404 (e.g., application 318), and a server 406 can be used to initiate generation of a verified data package. It should be appreciated that the server 406 can be the server 302 from FIG. 3. At 408, the application 404 on the user device (e.g., smart phone that includes an image-capturing device), can be used to scan the document 402. The document 402 can be an electronic document that includes biographical information of the user, a portrait of the user, and an embedded chip. In some instances, the document 402 can include a card or a page, such as a driver's license, and in other instances, the document can include a multi-page document (e.g., passport), and the user can open the document 402 to the page that includes the VIZ (e.g., portrait and biographical information), and the MRZ. The user can further aim the image-capturing device at the document 402 and capture the VIZ and the MRZ.

At 410, the application 404 on the user device can receive the information provided by the MRZ. The application 404 on the user device can use OCR techniques to identify the characters included in the MRZ. The application 404 on the user device can further be configured with standard MRZ data field layouts, and use the layouts to identify the different data fields included in the MRZ. The application on the user device can further use the information from the data fields to derive a first digital key and a second digital key. The first digital key can be used to access the information stored in the chip embedded in the document. The second digital key can be used to encrypt and decrypt communications between the application 404 and the embedded chip.

At 412, the application 404 on the user device 404 can cause a secure channel to be opened to communicate with the embedded chip and access the information stored in the embedded chip read using the first digital key and the second digital key. For example, the application 404 on the user device can use an application protocol data unit (APDU), (e.g., communication unit 326) for exchanging information between the application on the user device and the embedded chip. The APDU can define what a message exchanged between the user device 404 and the embedded chip should resemble, including a protocol header, a protocol body, and a protocol trailer.

At 414, the application 404 on the user device can retrieve data from a chip embedded in the document 402. For example, the application 404 on the user device can be configured to communicate using a short range transmission protocol (e.g., NFC, Bluetooth, Wi-Fi Aware) and cause a message to be transmitted to the embedded chip that includes the first digital key. The embedded chip can validate the communication with the application on the user device based on the first digital key. The embedded chip can acknowledge the validation and the application 404 on the user device can initiate a secure session to communicate with the embedded chip using a second digital key for encryption. The application 404 on the user device can retrieve the information from the chip, including the biographical information and the biometric information, during the secure session.

At 416, the application 404 on the user device, based on receiving the information from the embedded chip, can prompt the user to take a self-portrait photograph. For example, the application 404 on the user device can use the display device 324 to display a textual prompt or a visual prompt asking the user to take the live self-portrait photograph. The textual prompt can be text asking the user to take a self-portrait photograph. The visual prompt can be an illustration or a picture directing the user to take a self-portrait photograph. The user can enter an input to the prompt, which can initialize a camera application on the user device. The user device 404 can include an image capturing device (e.g., image capturing device 328) used to take the self-portrait photograph.

At 418, the application 404 on the user device can generate a signing key and a hardware attestation with biometric binding. The application 404 on the user device can biometrically lock the signing key to prevent anyone but the user device owner from accessing the signing key. For example, the application 404 on the user device can prevent any entity from accessing the signing key without providing a verifiable biometric signature (e.g., fingerprint, retinal scan, face print of the user).

At 420, the application 404 on the user device can use an encryption algorithm to encrypt the data retrieved from the embedded chip of the document 402, a hardware attestation, and the self-portrait photograph.

At 422, the application 404 on the user device can sign the encrypted data with the signing key.

At 424, the application 404 on the user device can cause the encrypted data to be transmitted to a server 406. The server 406 can be a verification server configured to verify that the person in the self-portrait photograph is the same person whose portrait is included in the document 402. In some instances, the server 406 may be a proprietary server associated with a manufacturer of the user device 404, for example, the system that configures/controls the server 406 may be the same as the system that configures/controls the application and/or the user device.

Figure 5:
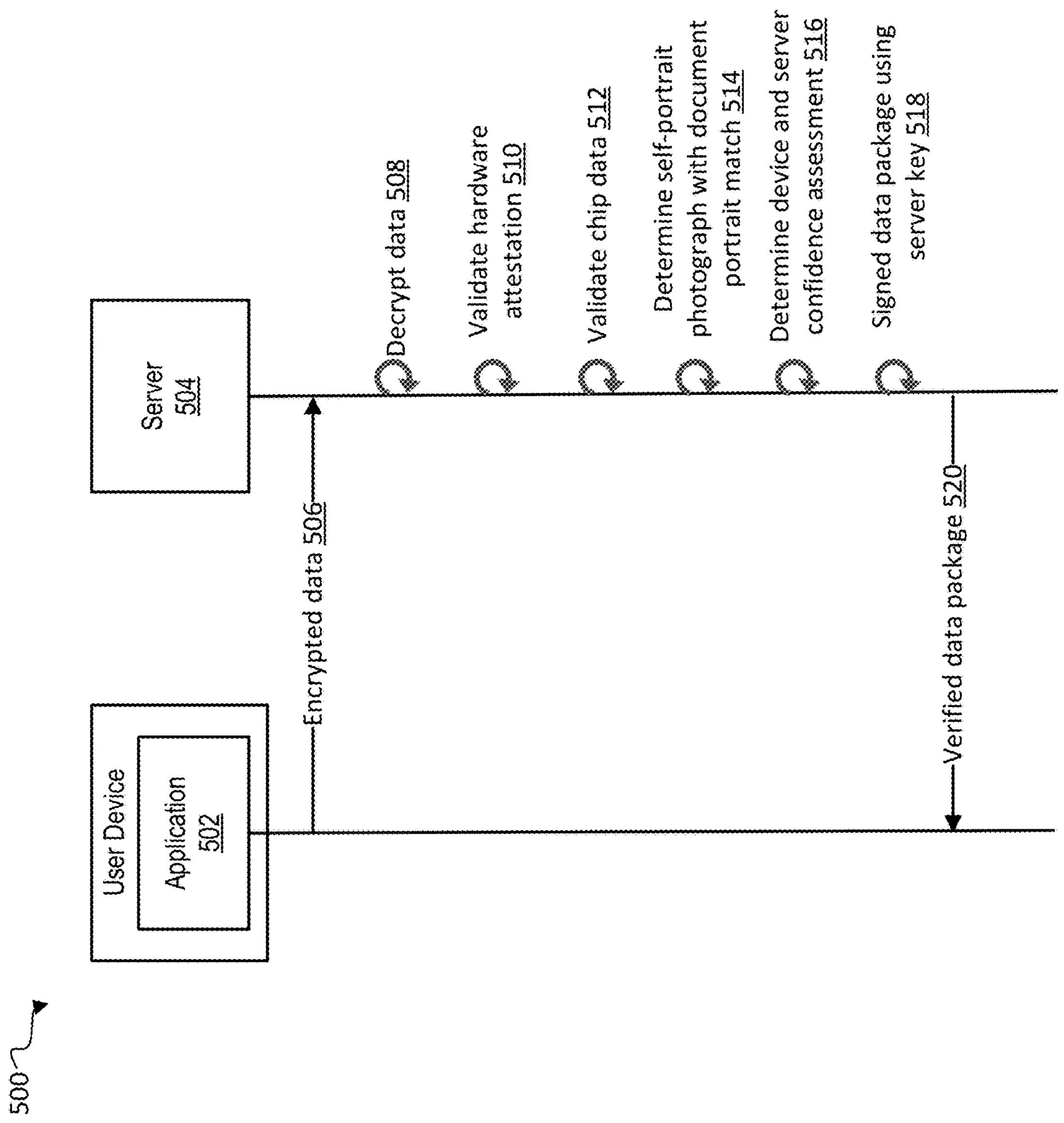
FIG. 5 is a signaling diagram for generating a verified data package, according to one or more embodiments.

FIG. 5 is a signaling diagram 500 for generating a verified data package, according to one or more embodiments. As illustrated, an application 502 on a user device (e.g., the application 318) can be in communication with a server 504 (e.g., the server 406 of FIG. 4). At 506, the application 502 on the user device can cause encrypted data to be transmitted to the server 504. The encrypted data can include information retrieved from an embedded chip of a document owned by the user, a hardware attestation, and a self-portrait photograph of the user. For example, the encrypted data can be the same encrypted data transmitted at step 424 of FIG. 4.

At 508, the server 504 can use a decryption algorithm and decrypt the encrypted data. The decryption algorithm can be associated with the encryption algorithm used in step 420 of FIG. 4. As indicated above, the application 502, the user device, and the server 504 can be associated with a same entity, such as the same manufacturer. Each of the application 502 on the user device and the server 504 can be respectively configured with an encryption algorithm to encrypt data and a decryption algorithm to decrypt the encrypted data.

At 510, the server 504 can validate the hardware attestation. The server 504 can be configured with information to validate the hardware attestation. For example, the hardware attestation can include a software used to boot the operating system of the user device-502, a user device identifier, and a manufacturer identifier. The server 504 can be configured with an identity of the software to be used to boot the operating system of the user device. The server 504 can further match the configured software identity with the software identified in the hardware attestation. The server 504 can further use the user device identifier to determine that the user device is in good standing. For example, the server 504 can communicate with a database associated with the manufacturer to determine that a user device with the user device identifier was manufactured by the manufacturer. The server 504 can further communicate with the database to determine whether the user device has been reported lost or stolen. The server 504 can ever further communicate with the database to determine whether the manufacturer identifier matches a manufacturer identifier stored at the database. The hardware attestation may include one more items of information that can be used by the server 504 to validate the user device. By validating the user device using the hardware attestation, the server 504 gains trust in the user device, which has been unknown to the server 504 prior to validating the hardware attestation.

At 512, the server 504 can validate the data retrieved from the chip embedded in the document. The validation can include determining whether there is an indication of that the data has been tampered with. The validation can further include identifying an issuing authority identifier and matching the identifier with a known issuing authority identifier. For example, if the embedded chip data is from an enhanced driver's license, the server can determine whether a state department of transportation identifier identified in the embedded chip data matches a known state department of transportation identifier. The validation can further include communicating with a state department of transportation database to determine whether the enhanced driver's license has been declared lost or stolen. Some embedded chip data may require additional steps for validation. For example, if the embedded chip data is from a passport, the server 504 can use a public key retrieved from a public key directory to verify a private key signature included in the embedded chip data. Once the embedded chip data is validated, the server 504 can trust that the embedded chip data is what it purports to be.

At 514, the server 504 can determine whether the person portrayed in the self-portrait photograph is the same person whose portrait is included in the embedded chip data. The server 504 can use image processing and a machine learning model to compare the self-portrait photograph, and the photograph from the document and generate a verification score. The server 504 can compare the verification score to a threshold score to determine whether the identity of the document owner matches the identity of the person who took the self-portrait photograph. The threshold score can vary based on an expected expectation of a relying party. For example, a secure organization, such as the military, may require a higher threshold score than a grocery store. The server can indicate the threshold score or scores that the verification score surpasses or does not surpass. This indication can be included in a verified data package. Once the server matches the self-portrait photograph with the portrait in from the embedded chip data, the server can discard the self-portrait photograph.

At 516, the server 504 can determine a user device and server 504 confidence assessment. This can be considered an anti-fraud assessment to determine whether either the user device or the server 504 itself are acting in a manner that is indicative of fraud. The confidence assessment can be based on various factors, such as determining whether any signaling has been performed indicative of fraud (e.g., transmitting or receiving a signal indicative of fraud, using a transmission protocol indicative of fraud, and error or artifacts in messaging indicative of fraud).

At 518, the server 504 can sign a data package using a server signing key to generate a verified data package. The verified data package can include the embedded chip data, including biographical information, portrait of the user, a device identifier, an attestation that the portrait matched a self-portrait photograph.

At 520, the server 504 can transmit the verified data package to the user device. The verified data package can be stored on the user device. The verified data package is a reusable, such that a user can use the application 502 on the user device to present the verified data package to one or more relying parties to verify the user's identity. For example, the application 502 on the user device can be used to present the verified data package to multiple relying parties without any additional modifications to the verified data package from the server 504, having to retrieve the verified data package from the server 504, and without permission from the server 504. The server's signature can act as an indication that the data package is a verified data package. A relying party can retrieve a server public key and verify the verified data package has been signed by a private key of the server 504.

Figure 6:
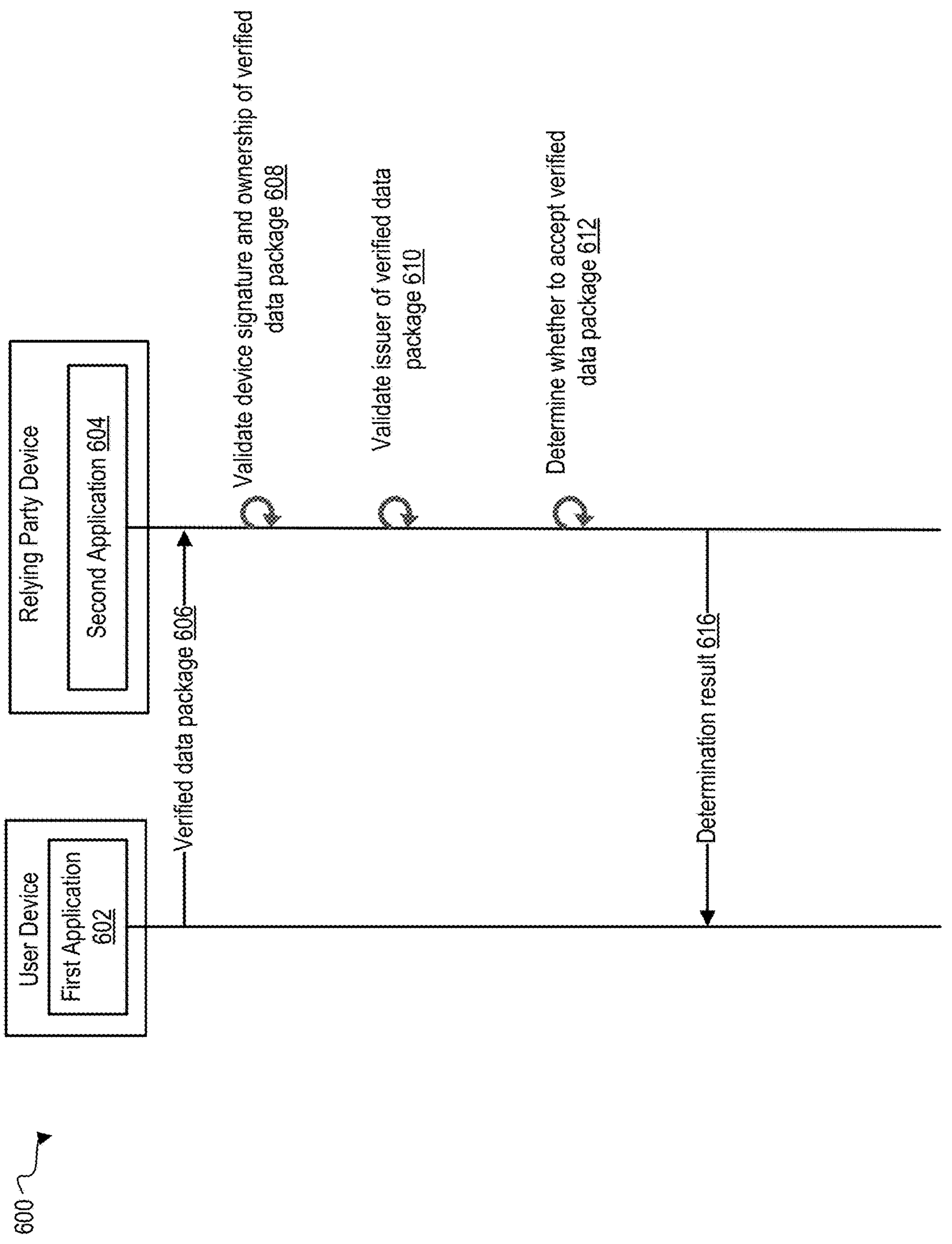
FIG. 6 is a signaling diagram for presenting a verified data package to a relying party, according to one or more embodiments.

FIG. 6 is a signaling diagram 600 for presenting a verified data package to a relying party, according to one or more embodiments. As indicated above, from time to time, a user may be requested to present the verified data package to a relying party. For example, a user may be requested to verify their age, residency, or identity to some relying party. The user can use the verified data package to present verified information to the relying party. As illustrated, a first application 602 (e.g., application 318) on a user device can be in communication with a second application 604 on a relying party device. The user device can be, for example, a smart phone, tablet, or laptop of a user. The relying party device can be a device, such as a device installed at a government building or at a commercial enterprise. The relying party device can be a reader device can communicate with the user device over a secure channel using a short-range transmission protocol (e.g., NFC, Bluetooth, Wi-Fi Aware). The relying party device can also be a computing device, such as a server, which can communicate with the user device over a secure channel, such as over the internet.

At 606, the first application 602 on the user device can cause a verified data package to be transmitted to the second application 604 on the relying party device. The verified data package can be an electronic form of a document (e.g., electronic passport, electronic identification card) include a biographical information of the user, a portrait of the user, an attestation that portrait of the user matched a self-portrait photograph, a device identifier, and a signature of a verifying authority (e.g., the server 504 of FIG. 5).

At 608, the second application 604 on the relying party device can validate the device signature and ownership of the verified data package. Validating the device signature and the ownership of the verified data package can indicate that the user device presenting the verified data package is the user device to which the authority issued the verified data package.

At 610, the second application 606 on the relying party device can validate the issuer of the verified data package. For example, as indicated above, the server 504 of FIG. 5 can sign the verified data package using a private key. The second application 604 on the relying party device can communicate with an entity, such as a public key infrastructure (PKI) to retrieve a public key that corresponds to the verifying authority's private key. The second application on the relying party device can further validate the signature using the public key. Validating the issuer of the verified data package can indicate an integrity of the verified data package and build trust in the verified data package for the relying party.

At 612, the second application 604 on the relying party device can determine whether to accept the verified data package. The second application 604 on the relying party device can include a set of rules for determining whether or not to accept the verified data package or not. For example, the second application 604 on the relying party device can be configured with rules that indicate a verified data package associated with a driver's license is acceptable, however, a verified data package associated with an identification card is not acceptable. The rules can be situation-specific and configurable by the relying party.

At 614, the second application 604 on the relying party device can transmit the determination result 616 of step 612 to the first application 602 on the user device. It should be appreciated that at any step 608 or 610 that validation is unsuccessful, the second application 604 on the relying party device can reject the verified data package.

Figure 7:
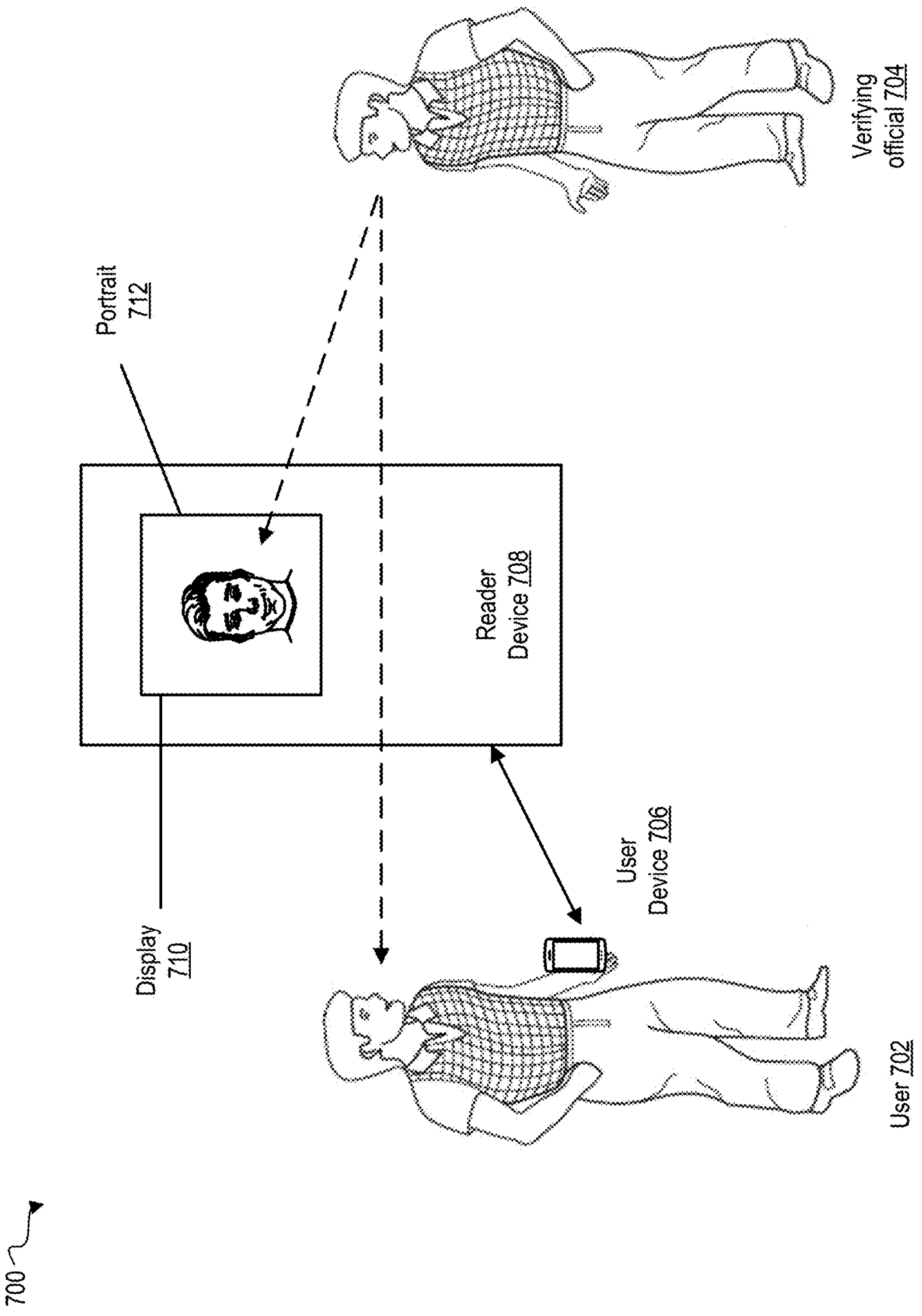
FIG. 7 is an illustration of a supplemental attestation of identity, according to one or more embodiments.

FIG. 7 is an illustration 700 of a supplemental attestation of identity, according to one or more embodiments. In some instances, a user may wish to include a supplemental attestation of identity, such as a mobile document or a verified data package. A mobile document can be an electronic form of a document (e.g., a digital passport). To do so, a mechanism can be established in which a trusted official can provide a digital attestation of digital portrait matching the physical appearance of the document holder. The digital attestation can include a unique identifier and a signature from the trusted official's device.

A user 702 can request that a verifying official 704 validate the user's digital portrait. The user can be a holder of a mobile document or verified data package. The mobile document can be stored on the user's user device 706. The verifying official 704 can be person, such as a law enforcement agent, notary, or other person with the capacity to provide the digital attestation. The mobile document or verified data package can be associated with, for example, passport, driver's license, or other identifying document.

The verifying official 704 can have access to a reader device 708 that includes a display 710. The reader device 708 can communicate with the user device 706 using a short-range transmission protocol. For example, the user device 706 can include an application that can communicate with an application on the reader device 708. The reader device can access a portrait 712 from the user device 706. The portrait can be an image of the user associated with a mobile document or verified data package (e.g., driver's license photograph, identification card photograph, passport photograph). The reader device 708 can cause the portrait 712 to be displayed on the display 710.

The verifying official 704 can look at the portrait 712 and the face of the user 702 and determine whether the user 702 is the same person as in the portrait 712. If the verifying official 704 determines that the user 702 is the same person as in the portrait 712, the verifying official 704 can use the reader device 708 to provide a digital attestation to the user device 706. The verifying official 704 determines that the user 702 is not the same person as in the portrait 712, the verifying official can elect to not provide the digital attestation.

Figure 8:
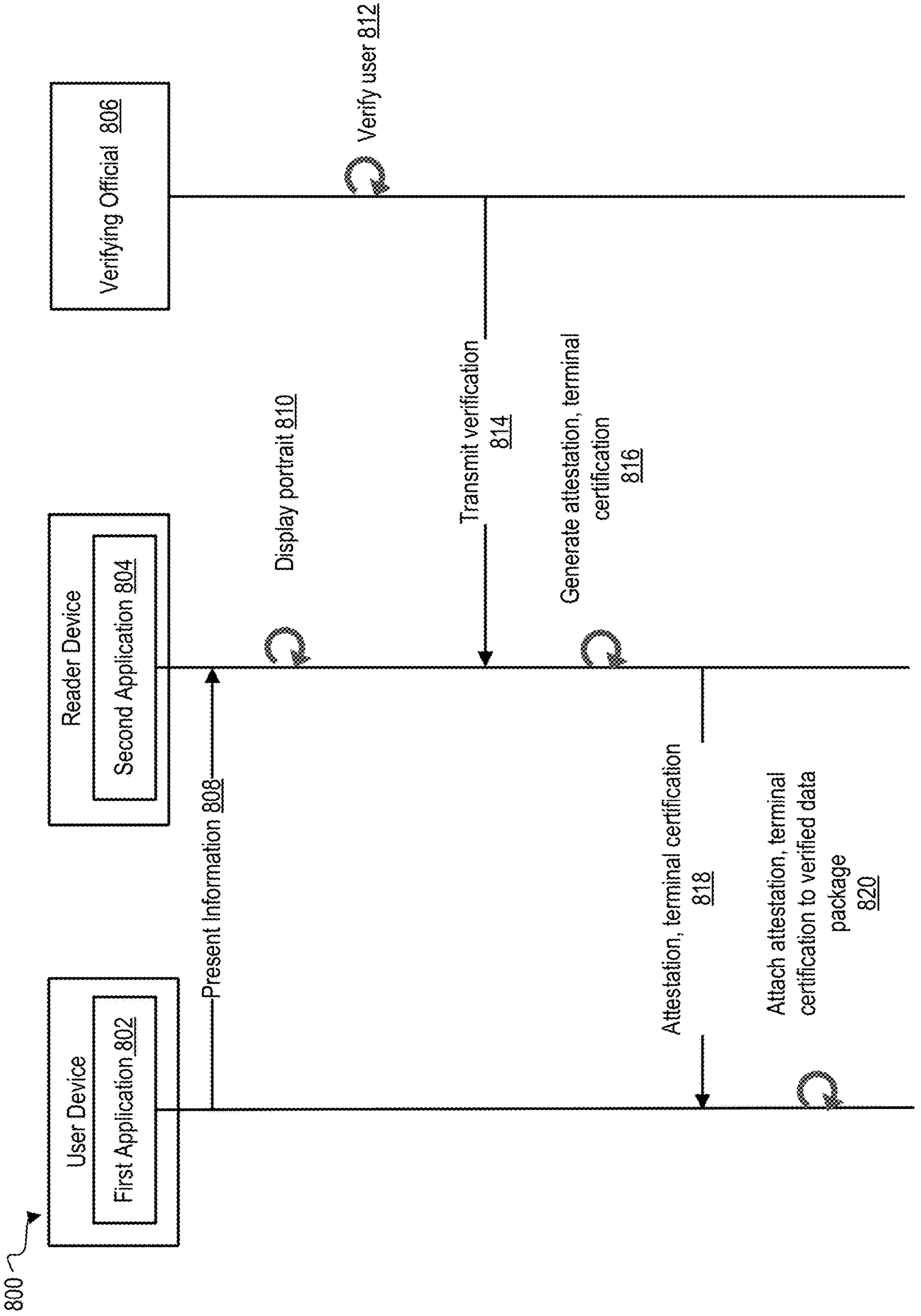
FIG. 8 is a signaling diagram for a supplemental attestation of identity, according to one or more embodiments.

FIG. 8 is a signaling diagram 800 of a supplemental attestation of identity, according to one or more embodiments. As illustrated, a first application 802 on a user device, a second application 804 on a reader device, and verifying official can communicate to generate a digital attestation of a user's identity. At 808, the first application 802 on the user device can present a document to a second application 804 on the reader device. The first application 802 on the user device and the second application on the reader device can communicate over a secure channel using a short-range transmission protocol to exchange information. The information can include a portrait and be a mobile document or a verified data package. The information can further include an issuing authority name of the authority that issued the mobile document or verified data package, personally identifiable information (PII) an issuing authority signature, an issuing authority certificate, and a device signature.

At 810, the second application 804 on the reader device can cause the portrait to be displayed on a display. The portrait can be, for example, the user's driver's license photograph, a flying license portrait, or some other document portrait.

At 812, the verifying official 806 can verify the user. The verifying official 806 can contemporaneously look at the portrait displayed on the reader device and the user's face to determine whether both are the same person. The verifying official can also validate other provided information including the PII (e.g., does an indicated height match the user's height?, does the device identifier match the device?)

At 814, the verifying official 806 can transmit a verification to the reader device 804 if the verifying official determines that the user is the person in the portrait. If the verifying official 806 does not determine that the user is the same person as in the portrait, the verifying official 806 does not have to transmit a verification to the reader device 804.

At 816, the second application 804 on the reader device can generate an attestation that the verifying official 806 determined that user that is physically present near the verifying official 806 is the same person whose portrait was displayed on the reader device. The attestation can be a supplemental attestation in the event that the user previously received a machine-based conformation of identity (e.g., the verified data package). The second application 804 on the reader device can further generate a terminal certification, which can include, for example, a reader device identifier, a verifying official identifier, a time stamp, a certificate of maintenance for the reader device 804, or other information useful to provide integrity to the attestation.

At 818, the second application 804 on the reader device can cause the attestation and the terminal certification to be transmitted to the first application 802 on the user device.

Figure 9:
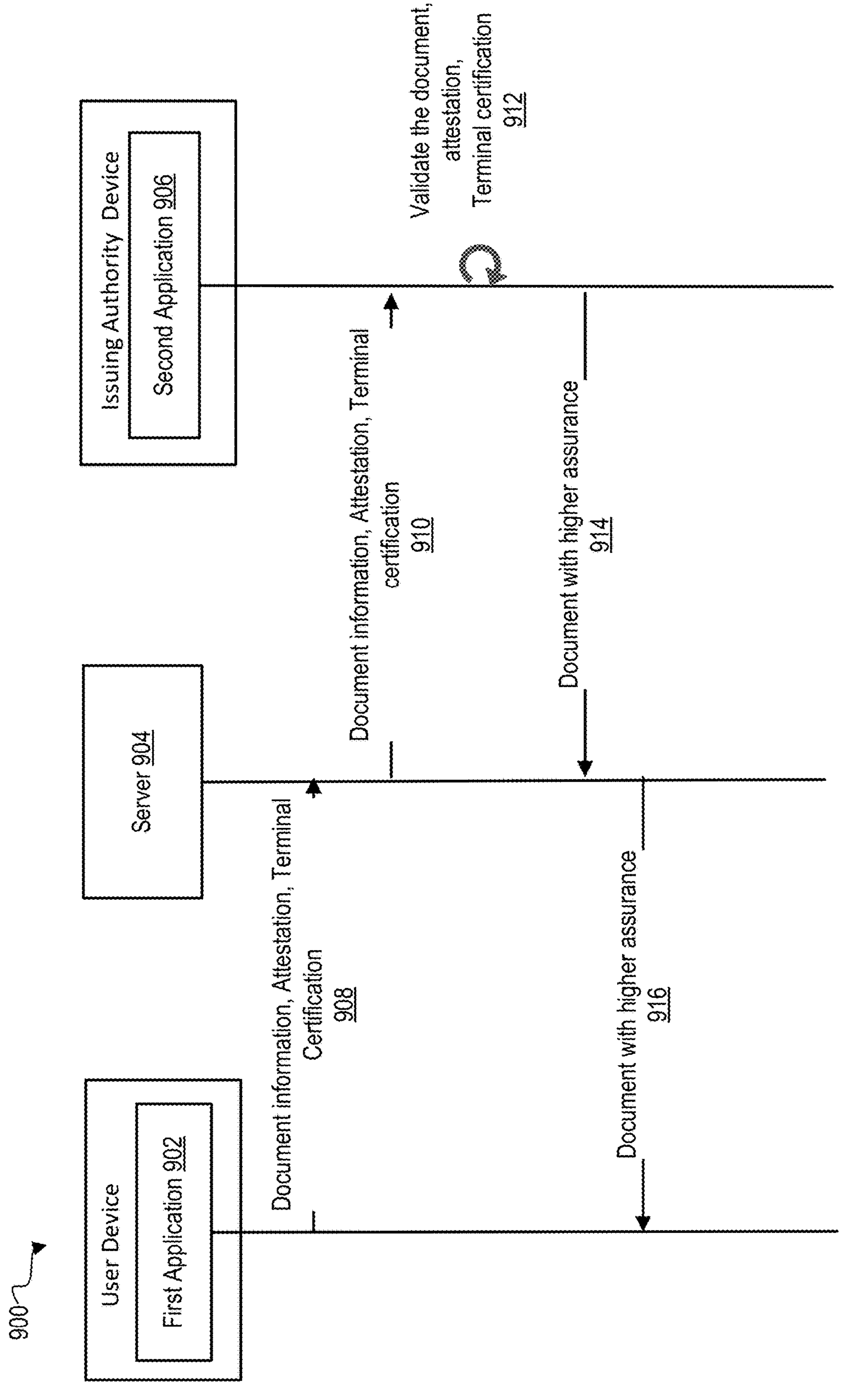
FIG. 9 is a signaling diagram for appending a verified data package with a supplemental attestation, according to one or more embodiments.

The attestation and the terminal certification can be included in a reissued verified data package as described in FIG. 9. Alternatively, the attestation and the terminal certification can be attached to the verified data package at 820. The first application 802 on the user device can receive the attestation and the terminal certification from the second application 804 on the reader device. The first application 802 on the user device can create a link between the verified data package and the attestation and the certification. The link can include a first pointer pointing from the verified data package to the attestation and the terminal certification if both the attestation and the terminal certification are stored in a single file. The link can also include a first pointer pointing from the verified data package to the attestation and a second pointer pointing from the verified data package to the terminal certification if both the attestation and the terminal certification are stored in separate files. In the instance that the attestation and the terminal certification are attached to the verified data package, the verified data package is not reissued as described in FIG. 9.

FIG. 9 is a signaling diagram 900 for appending a verified data package with a supplemental attestation, according to one or more embodiments. The supplemental attestation can be appended to a verified data package to provide enhanced assurances that the holder of a user device storing a verified data package is the person identified by the verified data package. As illustrated, a first application 902 on a user device, a server 904, and second application 906 on the issuing authority device can be in communication. At 908, the first application 902 on the user device can transmit document information, the attestation and terminal certification to the server 904. The server 904 can be the server 504 of FIG. 5. The document information can include mobile document information, such as ePassport information, or the document information can include the verified data package. In each case the information can include an issuing authority signature and a document identifier. The attestation and the terminal certification can include the attestation, a reader device identifier, a verifying official identifier, a time stamp, a certificate of maintenance for the reader device, or other information useful to provide integrity to the attestation. The transmission can include a device identifier for the user device. The server 904 can use the device identifier and other information (e.g., message header, encryption algorithm) to validate that the transmission is from a valid user device.

At 910, the server 904, based on validating the user device, can transmit the attestation and the terminal certification to a second application 906 on the issuing authority device. The issuing authority can be the authority that issued the mobile document that was used to generate the verified data package. For example, the issuing authority can be the driver's license office, passport authority, or identification card issuer.

At 912, the second application 906 on the issuing authority device can validate the attestation using the terminal certification. For example, the second application 906 on the issuing authority device can communicate with a database of the issuing authority to determine whether the reader device identifier, a verifying official identifier, a certificate of maintenance for the reader device are legitimate. The second application 906 on the issuing authority device can further validate the document. For example, the second application 906 on the issuing authority device can determine that the issuing authority signature is valid. The second application on the issuing authority device can further determine that the document identifier is valid and the document has not been reported lost or stolen. The second application 906 on the issuing authority device 906 can, in the instance of a mobile document, create a new mobile document that includes an attestation that a live facial matching, as described in FIGS. 7 and 8, was performed. In the case of a verified data package, the issuing authority can generate an attestation that a live facial matching, as described in FIGS. 7 and 8, was performed. In each case, the new mobile document or attestation can include an issuing authority device signature.

At 914, the second application on the issuing authority device can either transmit the new mobile document or the attestation to the server 904. The server 904 can validate transmission using the issuing authority signature. For example, the server 904 can communicate with an entity, such as a PKI, and retrieve a public key associated with issuing authority signature. The server 904 can further validate the issuing authority device signature using the public key.

At 916, if the issuing authority issued a new mobile document, the server 904 can transmit the mobile document to the user device 902. If the issuing authority issued an attestation, the server 904 can generate a new verified data package that includes a supplemental attestation of the live facial matching. The server 904 can further transmit the new verified data package to the user device 902. The first application 902 on the user device can discard the old, verified data package and store the new verified data package.

Figure 10:
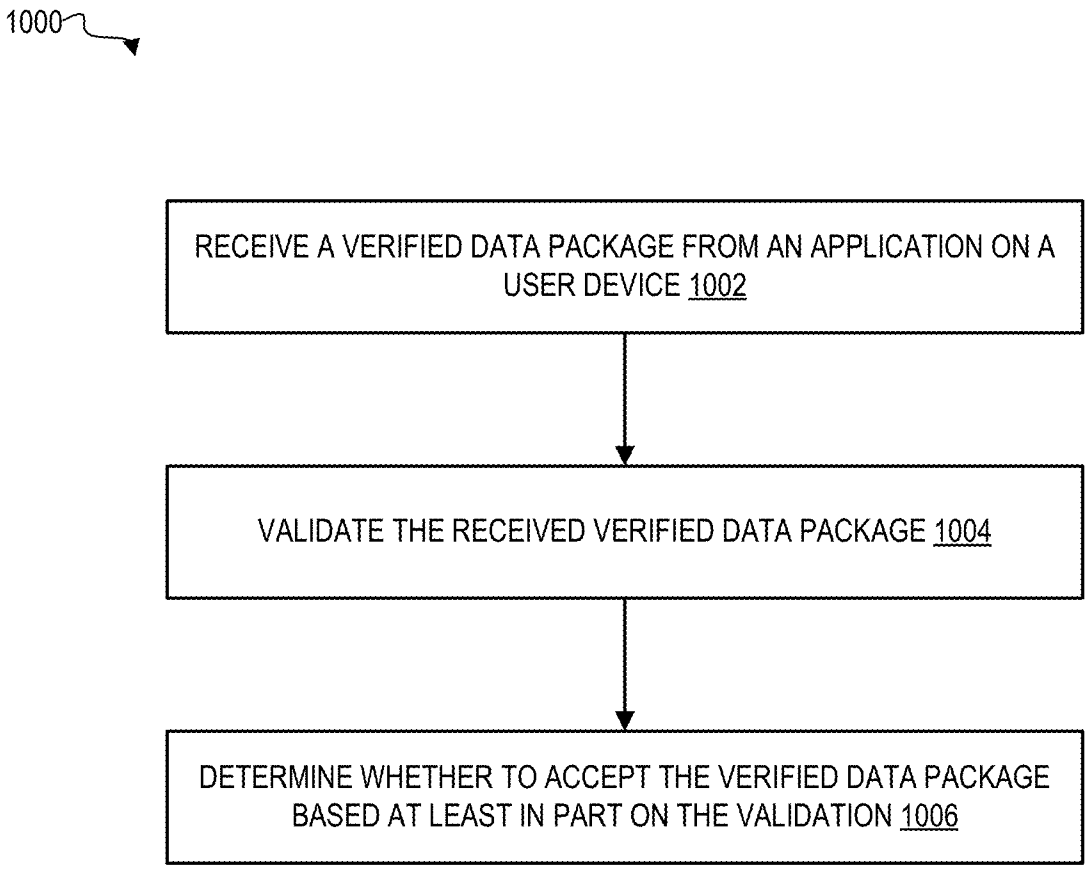
FIG. 10 is a process flow for presenting a verified data package, according to one or more embodiments.

FIG. 10 is a process flow 1000 for presenting a verified data package, according to one or more embodiments. It should be appreciated that the functionality described for the user device and the computing device can be effectuated by a respective application on each of the devices. From time to time, a user may wish to present their verified data package to a relying party (e.g., picking up medication from a pharmacist). The relying party can perform a set of steps to determine whether or not to accept the verified data package. At 1002, computing device can receive a verified data package from a user device. The computing device can be a reader device of a relying party. The computing device can receive the verified data package via a short range transmission protocol, such as Bluetooth or NFC. The computing device can also receive the verified data package over a long range transmission protocol, for example, over the internet.

In some instances, the verified data package can include an attestation from a verifying official (e.g., the verifying official 806 of FIG. 8) and a terminal certification. This verifying official attestation and terminal certification can either be attached to the verified data package as described with respect to step 820 of FIG. 8 or embedded in a reissued verified data package as described in FIG. 9.

At 1004, the computing device can validate the received verified data package. The computing device can communicate with a server of one or move issuing authorities to determine whether the document used to generate the verified data package is valid (e.g., has driver's license been suspended, revoked, or reported stolen; has the document expired, or is there some indication to question the validity of the verified data package). The computing device can further validate the user device signature and ownership of the verified data package. The computing device can validate the issuer of the verified data package.

At 1006, the computing device can determine whether to accept the verified data package based at least in part on the validation. The computing device can be configured with a set of rules for determining whether or not to accept the verified data package or not. In addition to the rules, it is possible that a person capable of assisting the computing device is present at the time of presentment. The computing device can include a display that displays the portrait included in the verified data package. The relying party person can look at the display and determine whether the user presenting the verified data package is the same as the person being displayed on the computing device. If the user does not match the portrait, the relying party person can choose not to accept the verified data package.

FIG. 11 is a process flow 1100 for initiating generating a verified data package, according to one or more embodiments. At 1102, the method can include an application on a computing device receiving data including biographical information and an associated portrait. The computing device can be, for example, a smart phone, tablet, or laptop computer. The data can be received from a chip embedded in a physical document, such as a passport or an identification card. The application on the computing device and the embedded chip can communicate using a secure channel.

At 1104, the method can include the application on the computing device causing a prompt for a user to capture a self-portrait photograph to be displayed based at least in response to receiving the data. For example, the application can generate control instructions to cause a user device display to display the prompt. The prompt can be a visual prompt that includes text or images that would cause a user to take a self-portrait photograph.

At 1106, the method can include the application on the computing device causing the self-portrait photograph to be captured based at least in part receipt of a selection of the prompt. For example, the user device can include an image capturing device. In some instances, the application can launch an image capture application to enable the image capturing device to capture an image. In other instances, the application can communicate with the image capture application to access a captured image. The self-portrait image can be taken using the computing device and include a time stamp. The time stamp can be compared with a time of receiving the data to verify that both occurred contemporaneously.

At 1108, the method can include the application on the computing device causing the data and the self-portrait photograph to be transmitted to a server. For example, the application can generate control instructions to cause the self-portrait photograph to be transmitted to the server. The transmission can further include a request to generate a verified data package. The data and the self-portrait photograph can be encrypted and the encrypted data can be signed using a private key generated by the user device. The signing key can be biometrically secured in the computing device. The transmission can further include a hardware attestation that can be used by the server to validate the computing device.

At 1110, the method can include receiving, from the server, a verified data package comprising the biographical information, the portrait, and an attestation that the self-portrait photograph and the portrait are the user. The verified data package can be stored on the computing device and reused for presentation to different relying parties.

Figure 12:
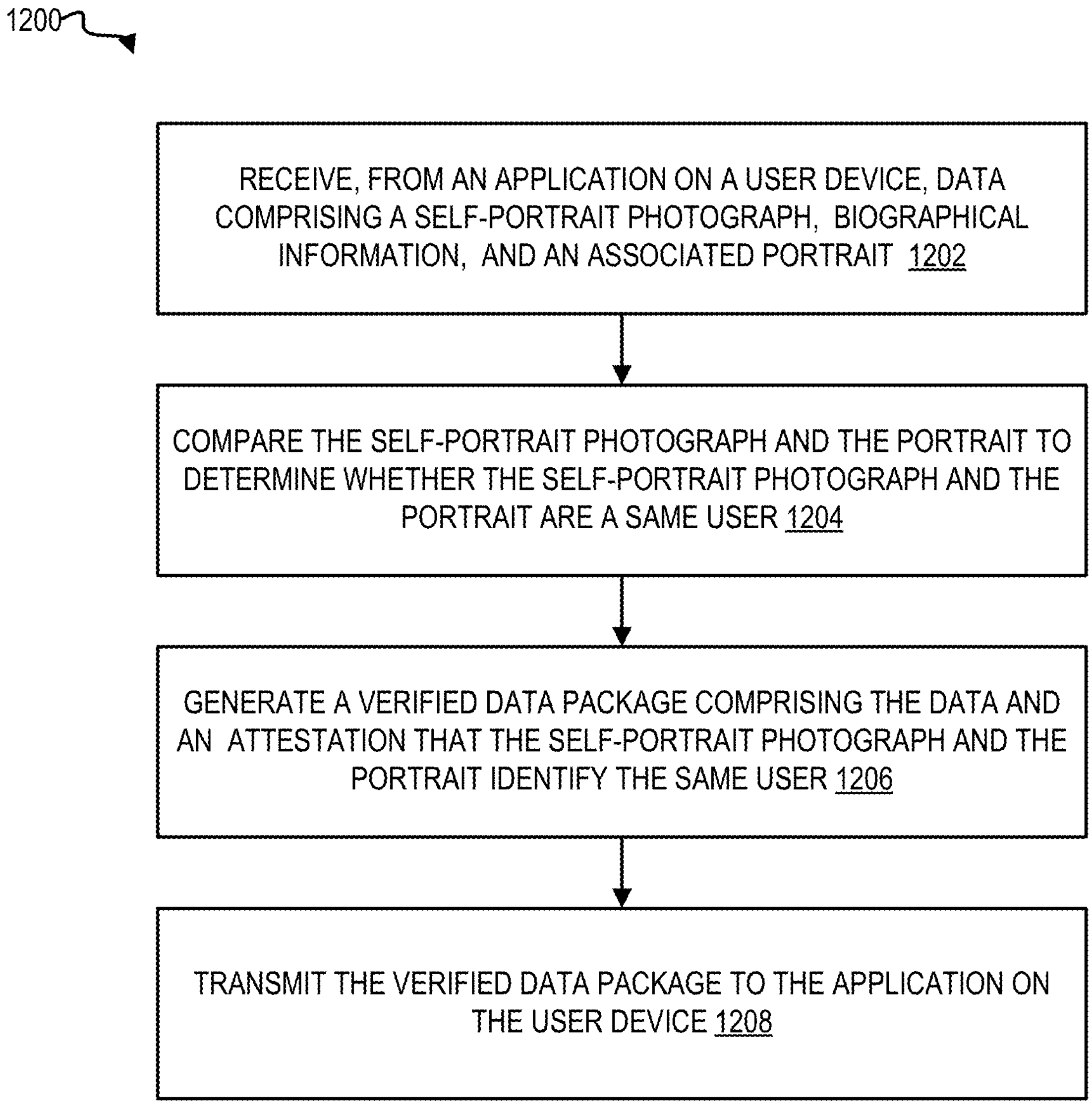
FIG. 12 is a process flow for generating a verified data package, according to one or more embodiments.

FIG. 12 is a process flow 1200 for generating a verified data package, according to one or more embodiments. At 1202, the method can include receiving, from an application on a user device, data comprising a self-portrait photograph, biographical information and an associated portrait. The server can further receive a request to generate a verified data package, and a hardware attestation. The transmission can further be encrypted. The server can decrypt the transmission and verify the user device using the hardware attestation.

At 1204, the method can include comparing the self-portrait photograph and the portrait to determine whether the self-portrait photograph and the portrait are a same user. The server can use image processing techniques and a model, such as a machine learning model to compare the images to determine whether each portray the same person.

At 1206, the method can include generating a verified data package comprising the data and an attestation that the self-portrait photograph and the portrait identify the same user. The verified data package can further be signed by the server and include a device identifier of the user device. If at step 1204, the server had determined that the images do not portray the same person the server can discontinue the process and would not perform step 1206.

At 1208, the method can include transmitting the verified data package to an application on the user device. The user device can then store the verified data package.

While specific embodiments have been described, one skilled in the art will recognize that numerous modifications are possible. A single controller may use processes described herein to establish pairings with any number of accessories and to selectively communicate with different accessories at different times. Similarly, a single accessory may be controlled by multiple controllers with which it has established pairings. Any function of an accessory may be controlled by modeling the function as a service having one or more characteristics and allowing a controller to interact with (e.g., read, modify, receive updates) the service and/or its characteristics. Accordingly, protocols and communication processes as described herein may be "universal," meaning that they may be applied in any context with one or more controllers and one or more accessories regardless of accessory function or controller form factor, or specific interfaces.

Thus, although specific embodiments have been described, it will be appreciated that embodiments may include all modifications and equivalents within the scope of the following claims.

As described above, one aspect of the present technology is the gathering and use of data available from specific and legitimate sources to improve the delivery of messages from one device to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, date of birth, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk may be minimized by limiting the collection of data and deleting data once it is no longer needed. In addition, and when applicable, including in certain health related applications, data de-identification may be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments may also be implemented without the need for accessing such personal information data. That is, the various embodiments of the present technology are not rendered inoperable due to the lack of all or a portion of such personal information data. For example, content may be selected and delivered to users based on aggregated non-personal information data or a bare minimum amount of personal information, such as the content being handled only on the user's device or other non-personal information available to the content delivery services.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein may be implemented on the same processor or different processors in any combination. Accordingly, where components or modules are described as being configured to perform certain operations, such configuration may be accomplished, e.g., by designing electronic circuits to perform the operation, by programming programmable electronic circuits (such as microprocessors) to perform the operation, or any combination thereof. Processes may communicate using a variety of techniques, including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

EXAMPLES

In the following sections, further example embodiments are provided.

Example 1 includes a method, comprising: receiving, by a computing device, data including biographical information and an associated portrait; displaying, on a user interface of the computing device, a prompt for capturing a self-portrait photograph based at least in response to receiving the data; capturing, by the computing device, the self-portrait photograph based at least in part on receipt of a selection of the prompt; transmitting, by the computing device, the data and the self-portrait photograph to a server; and receiving, by the computing device and from the server, a verified data package comprising the biographical information, the associated portrait, and an attestation that the self-portrait photograph and the associated portrait correspond to a user.

Example 2 includes the method of example 1, wherein the data is received from a chip embedded in a document associated with the user.

Example 3 includes the method of any of examples 1 or 2, wherein the method further comprises: encrypting the data and the self-portrait photograph; and signing the encrypted data and the self-portrait photograph using a private key, wherein the private key is biometrically secured in the computing device.

Example 4 includes the method of any of examples 1-3, wherein the data is a first data captured from a physical document, and wherein the method further comprises validating the first data based at least in part on second data received from a machine readable zone (MRZ) of the physical document.

Example 5 includes the method of any of examples 1-4, wherein the verified data package further includes a computing device identifier associated with the computing device, and wherein the verified data package is signed by a private key of the server.

Example 6 includes the method of any of examples 1-5, wherein the method further comprises: receiving an input to present the verified data package to a reader device; and transmitting the verified data package to the reader device using a short range transmission protocol.

Example 7 includes the method of example 6, wherein the attestation is a first attestation, and wherein the method further comprises receiving, from the reader device, a second attestation that the portrait matches the user.

Example 8 includes the method of example 7, wherein the verified data package is a first verified data package, and wherein the method further comprises: transmitting the second attestation to the server; and receiving a second verified data package, wherein the second verified data package comprises the second attestation.

Example 9 includes the method of example 7 wherein the method further comprises attaching the second attestation to the verified data package.

Example 10 includes a computing device, comprising: one or more processors, and one or more computer readable media having stored thereon a sequence of instructions that, when executed, cause the one or more processors to perform the steps of any of examples 1-9.

Example 11 includes one or more non-transitory computer-readable media including stored thereon instructions that, when executed, cause one or more processors to perform the steps of any of examples 1-9.

Example 12 includes a method, comprising: receiving, by a server and from a user device, data comprising a self-portrait photograph, biographical information, and an associated portrait; comparing, by the server, the self-portrait photograph and the portrait to determine whether the self-portrait photograph and the portrait are a same user; generating, by the server, a verified data package comprising the data and an attestation that the self-portrait photograph and the portrait identify the same user; and transmitting, by the server, the verified data package to the user device.

Example 13 includes the method of example 12, wherein the method further comprises: receiving a hardware attestation from the user device; validating the user device based at least in part on the hardware attestation; and generating the verified data package based at least in part on the validation of the user device.

Example 14 includes the method of any of examples 12 or 13, wherein the method further comprises validating the data based at least in part on a signature of an issuing authority of the data.

Example 15 includes the method of any of examples 12-14, wherein generating the verified data package further comprises signing the verified data package using a private key of the server.

Example 16 the method of any of examples 12-15, wherein the data is received as encrypted data, and wherein method further comprises decrypting the data, wherein an encryption method used to encrypt the data is used to validate the user device.

Example 17 includes the method of example 16, wherein the verified data package is a first verified data package, wherein the attestation is a first attestation, and wherein the method further comprises: receiving a second attestation that the portrait matches the user; generating a second verified data package comprising the second attestation; and transmitting the second attestation to the user device.

Example 18 includes the method of example 17, wherein the attestation is a first attestation, and wherein the method further comprises: receiving a second attestation that the portrait matches the user; and attaching the second attestation to the verified data package.

Example 19 includes the method of example 18, wherein the method further comprises: receiving a terminal certification comprising a reader device identifier, wherein the reader device generated the second attestation; and validating the second attestation based at least in part on the validating the reader device by using the reader device identifier.

Example 20 includes a computing device, comprising: one or more processors, and one or more computer readable media having stored thereon a sequence of instructions that, when executed, cause the one or more processors to perform the steps of any of examples 12-19.

Example 21 includes one or more non-transitory computer-readable media including stored thereon instructions that, when executed, cause one or more processors to perform the steps of any of examples 12-19.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments may be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by an application on a computing device, data scanned from a machine readable zone (MRZ) of a passport, the data comprising first biographical information and an associated portrait;

receiving, by the application on the computing device and from an embedded chip of the passport, second biographical information;

causing, by the application on the computing device, display of a prompt for capturing a self-portrait photograph, the prompt to be displayed based at least in response to receiving the first biographical information and the second biographical information;

causing, by the application on the computing device, the self-portrait photograph based at least in part on receipt of a selection of the prompt;

causing, by the application on the computing device, the data and the self-portrait photograph to be transmitted to a server; and receiving, by the application on the computing device and from the server, a verified data package comprising the biographical information, the associated portrait, and an attestation that the self-portrait photograph and the associated portrait correspond to a user.

2. The method of claim 1, wherein the method further comprises:

encrypting, by the application on the computing device, the data and the self-portrait photograph; and signing, by the application on the computing device, the encrypted data and the self-portrait photograph using a private key, wherein the private key is biometrically secured in the computing device.

3. The method of claim 1, wherein the method further comprises validating, by the application on the computing device, the first biographical information based at least in part on second biographical information received from the machine readable zone (MRZ).

4. The method of claim 1, wherein the verified data package further comprises a computing device identifier associated with the computing device, and wherein the verified data package is signed by a private key of the server.

5. The method of claim 1, wherein the method further comprises:

receiving, by the application on the computing device, an input to present the verified data package to a reader device; and transmitting, by the application on the computing device, the verified data package to the reader device using a short-range transmission protocol.

6. The method of claim 1, wherein the attestation is a first attestation, and wherein the method further comprises:

causing the associated portrait to be presented on a display; and receiving a digital attestation indicating that an official verified that a person associated with the computing device is a same person as displayed in the associated portrait.

7. The method of claim 6, wherein the verified data package is a first verified data package, and wherein the method further comprises:

causing, by the application on the computing device, the digital attestation to be transmitted to the server; and receiving, by the application on the computing device, a second verified data package, wherein the second verified data package comprises the digital attestation.

8. The method of claim 6, wherein the method further comprises attaching, by the application on the computing device, the digital attestation to the verified data package.

9. A computing device, comprising:

one or more processors associated with an application, and one or more computer readable media having stored thereon a sequence of instructions that, when executed, cause the one or more processors to execute an application configured to:

receive data scanned from a machine readable zone (MRZ) of a passport, the data comprising first biographical information and an associated portrait;

receive, by the application, and from an embedded chip of the passport, second biographical information;

cause, by the application, display of a prompt for capturing a self-portrait photograph, the prompt to be displayed based at least in response to receiving the first biographical information and the second biographical information;

cause, by the application, the self-portrait photograph to be captured based at least in part on receipt of a selection of the prompt;

cause, by the application, the data and the self-portrait photograph to be transmitted to a server; and receive, by the application and from the server, a verified data package comprising the biographical information, the associated portrait, and an attestation that the self-portrait photograph and the associated portrait correspond to a user.

10. The computing device of claim 9, wherein the instructions that, when executed, further cause the one or more processors to:

encrypt, by the application, the data and the self-portrait photograph; and sign, by the application, the encrypted data and the self-portrait photograph using a private key, wherein the private key is biometrically secured in the computing device.

11. The computing device of claim 9, wherein the instructions that, when executed, further cause the one or more processors to:

validate, by the application, the first biographical information based at least in part on second biographical information received from the machine readable zone (MRZ).

12. The computing device of claim 9, wherein the verified data package further comprises a computing device identifier associated with the computing device, and wherein the verified data package is signed by a private key of the server.

13. The computing device of claim 9, wherein the instructions that, when executed, further cause the one or more processors to:

receive input to present the verified data package to a reader device; and cause, by the application, the verified data package to be transmitted to the reader device using a short-range transmission protocol.

14. The computing device of claim 13, wherein the attestation is a first attestation, and wherein the instructions that, when executed, further cause the one or more processors to:

cause the associated portrait to be presented on a display; and receive a digital attestation indicating that an official verified that a person associated with the computing device is a same person as displayed in the associated portrait.

15. The computing device of claim 14, wherein the instructions that, when executed, further cause the one or more processors to:

attach, by the application, the digital attestation to the verified data package.

16. The computing device of claim 14, wherein the verified data package is a first verified data package, and wherein the instructions that, when executed, further cause the one or more processors to:

cause, by the application the digital attestation to be transmitted to the server; and receive, by the application, a second verified data package, wherein the second verified data package comprises the digital attestation.

17. One or more non-transitory computer-readable media including instructions stored thereon that, when executed, cause one or more processors to execute an application configured to:

receive, by the application, data scanned from a machine readable zone (MRZ) of a passport, the data comprising first biographical information and an associated portrait;

receive, by the application and from an embedded chip of the passport, second biographical information;

cause, by the application, display of a prompt for capturing a self-portrait photograph, the prompt to be displayed based at least in response to receiving the first biographical information and the second biographical information;

cause, by the application, the self-portrait photograph to be captured based at least in part on receipt of a selection of the prompt;

cause, by the application, the data and the self-portrait photograph to be transmitted to a server; and receive, by the application and from the server, a verified data package comprising the biographical information, the associated portrait, and an attestation that the self-portrait photograph and the associated portrait correspond to a user.

* * * * *